(12) United States Patent
Ebert et al.

(10) Patent No.: US 12,458,255 B2
(45) Date of Patent: Nov. 4, 2025

(54) DEVICE AND METHOD FOR THE NON-INVASIVE DETERMINATION OF ANALYTES

(71) Applicant: INSPIRITY AG, Steinhausen (CH)

(72) Inventors: Dieter Ebert, Gottlieben (CH); Rolf-Dieter Klein, Munich (DE)

(73) Assignee: INSPIRITY AG, Steinhausen (CH)

( * ) Notice: Subject to any disclaimer, the term of this patent is extended or adjusted under 35 U.S.C. 154(b) by 765 days.

(21) Appl. No.: 17/764,715

(22) PCT Filed: Sep. 17, 2020

(86) PCT No.: PCT/EP2020/076022
§ 371 (c)(1),
(2) Date: Mar. 29, 2022

(87) PCT Pub. No.: WO2021/063695
PCT Pub. Date: Apr. 8, 2021

(65) Prior Publication Data
US 2022/0409105 A1 Dec. 29, 2022

(30) Foreign Application Priority Data
Sep. 30, 2019 (EP) .................................... 19200618

(51) Int. Cl.
*A61B 5/145* (2006.01)
*A61B 5/00* (2006.01)
(Continued)

(52) U.S. Cl.
CPC .......... *A61B 5/14532* (2013.01); *A61B 5/015* (2013.01); *A61B 5/0507* (2013.01);
(Continued)

(58) Field of Classification Search
CPC ............ A61B 5/14532; A61B 5/14546; A61B 5/0086; A61B 5/1477; A61B 2018/00791;
(Continued)

(56) References Cited

U.S. PATENT DOCUMENTS 5,615,672 A    4/1997   Braig et al.
6,026,314 A *   2/2000   Amerov ................ A61B 5/1455
                                                         600/316
(Continued)

FOREIGN PATENT DOCUMENTS

CN    205251548 U    5/2016
CN    107205699 A    9/2017
(Continued)

OTHER PUBLICATIONS

Laman et al, 'High-Resolution Waveguide THz Spectroscopy of Biological Molecules', Biophys J. 94, 1010-1020 (2008).
(Continued)

*Primary Examiner* — Gerald Johnson
(74) *Attorney, Agent, or Firm* — Rothwell, Figg, Ernst & Manbeck, P.C.

(57) ABSTRACT

The present invention relates a device and a method for noninvasively determining an analyte in blood, in particular for noninvasively determining an analyte in capillary blood.

27 Claims, 9 Drawing Sheets

(51) Int. Cl.
*A61B 5/01* (2006.01)
*A61B 5/0507* (2021.01)
*G01N 21/3581* (2014.01)
*G01N 33/49* (2006.01)

(52) U.S. Cl.
CPC .......... *A61B 5/6826* (2013.01); *A61B 5/6843* (2013.01); *G01N 21/3581* (2013.01); *G01N 33/49* (2013.01)

(58) Field of Classification Search
CPC .. A61B 2018/00452; A61B 2562/0271; A61B 5/150022; A61B 5/1451; A61B 8/546; A61B 2018/00047; A61B 2018/00005; A61B 2018/00714; A61B 2090/065; A61B 1/128; A61B 2018/00815; A61B 2018/00904; A61B 2018/00821; A61B 2562/0242; A61B 2560/0252; A61N 2005/0626; A61N 2005/005; A61N 2007/0095; A61N 2007/0056
See application file for complete search history.

(56) References Cited

U.S. PATENT DOCUMENTS

| | | | |
|---|---|---|---|
| 2002/0180385 A1* | 12/2002 | Ferrieu | G01N 21/211 315/500 |
| 2004/0065832 A1* | 4/2004 | Cluff | G02B 26/101 250/341.1 |
| 2007/0073115 A1* | 3/2007 | Hwang | A61B 5/14535 600/309 |
| 2008/0033266 A1* | 2/2008 | Diab | A61B 5/7246 600/336 |
| 2014/0163362 A1 | 6/2014 | Pahlevan et al. | |
| 2014/0172374 A1 | 6/2014 | Brady | |
| 2016/0051171 A1* | 2/2016 | Pikov | A61B 5/0507 600/407 |
| 2016/0080665 A1 | 3/2016 | Barnes et al. | |
| 2016/0192867 A1 | 7/2016 | Esenaliev | |
| 2016/0367173 A1* | 12/2016 | Dalvi | A61B 5/6838 |
| 2017/0014056 A1* | 1/2017 | Newberry | A61B 5/1455 |
| 2017/0164878 A1* | 6/2017 | Connor | G09B 19/00 |
| 2018/0112973 A1* | 4/2018 | Sikora | G01J 5/10 |
| 2019/0183398 A1* | 6/2019 | Heikenfeld | A61B 5/4272 |
| 2021/0041376 A1 | 2/2021 | Ashiwal et al. | |
| 2021/0311018 A1* | 10/2021 | Harrington | G01N 21/3577 |
| 2022/0287600 A1* | 9/2022 | Reichl | A61B 5/1455 |

FOREIGN PATENT DOCUMENTS

| | | |
|---|---|---|
| CN | 110141248 A | 8/2019 |
| JP | 2016188778 A | 11/2016 |
| WO | 2007071092 A1 | 6/2007 |
| WO | 2014206549 A1 | 12/2014 |
| WO | 2018122319 A1 | 7/2018 |
| WO | 2019034722 A1 | 2/2019 |

OTHER PUBLICATIONS

Upadhya et al, 'Terahertz Time-Domain Spectroscopy of Glucose and Uric Acid', J. of Biol Phys 29 117-121 (2003).
Song et al, 'Terahertz and infrared characteristic absorption spectra of aqueous glucose and fructose solutions', Nature, Scientific reports (2018) 8:8964, 8 pgs.
Tuohiniemi et al, 2012, 'Optical transmission performance of a surface-micromachined Fabry-Perot interferometer for thermal infrared', J. Micromech Microeng 22, (2012) 115004, 7 pgs.
Tuohiniemi et al, 2013, 'Characterization of the tuning performance of a micro-machined Fabry-Perot interferometer for thermal infrared', J. Micromech Microeng 23 (2013) 075011, 7 pgs.
International Search Report issued in PCT/EP2020/076022, dated Oct. 29, 2020, 5 pgs.

* cited by examiner

DEVICE AND METHOD FOR THE NON-INVASIVE DETERMINATION OF ANALYTES

CROSS REFERENCE TO RELATED APPLICATION

This application is a 35 U.S.C. 371 National Phase Entry Application from PCT/EP2020/076022, filed Sep. 17, 2020, which claims the benefit of European Patent Application No. 19200618.7 filed on Sep. 30, 2019, the disclosures of which are incorporated herein in their entirety by reference.

The present invention relates to a device and a method for the non-invasive determination of an analyte in blood, by acquisition and evaluation of radiation from the terahertz range and the IR range, in particular the non-invasive determination of analytes in capillary blood.

In 2016, approximately 415 million people were suffering from diabetes. For 2040, an increase to over 640 million people is to be expected. For diabetes patients, precise monitoring of the concentration of glucose in the blood is required, in order to allow for corresponding medication. There is therefore a significant need for reliable methods for determining glucose in blood, which are easy for the patient to implement.

Currently, the determination of glucose in blood is based mainly on invasive methods. In this case, either a blood sample is taken from the patient in question and subsequently subjected to an in vitro test, or a sensor is implanted in the patient, which serves for in vivo determination of glucose. A disadvantage of invasive methods of this kind is that they are painful and uncomfortable for the patient.

In order to overcome this disadvantage, numerous approaches for non-invasive determination of the concentration of glucose in blood have already been developed. However, none of these approaches has yet achieved commercial importance.

WO 2014/0206549 describes a device for measuring raw data for non-invasive determination of a blood parameter, for example the concentration of glucose, infrared (IR) radiation from an external radiation source being coupled in a two-dimensional manner into the body surface, to be examined, of the patient, at a plurality of measuring points, and the IR radiation generated in the body surface being acquired, at a plurality of measuring points, by a sensor device. A disadvantage of this method, however, is that it requires significant outlay in terms of apparatus.

WO 2018/122 relates to a device and a method for non-invasive quantitative determination of an analyte in the blood, in particular for non-invasive quantitative determination of glucose in capillary blood. For this purpose, a selected body region is irradiated with IR radiation in the region of preferably 8-12 µm. Subsequently, a selective evaluation of the reflected IR radiation, from blood vessels of the irradiated body region that are close to the surface, takes place.

WO 2019/034722 also relates to a device and a method for non-invasive quantitative determination of an analyte in the blood, in particular for non-invasive quantitative determination of glucose in capillary blood. In this case, an evaluation of the IR radiation emitted by the body in a wavelength range of 8-12 µm preferably takes place without the use of external radiation sources.

The absorption maxima of glucose and other clinically relevant analytes in the terahertz range, and the spectrometric determination thereof in vitro, are described for example by Laman et al., Biophys. J. 94 (2008), 1010-1020, Upadhya et al., J. Biol. Phys. 29 (2003), 117-121, or Song et al., Scientic Report 8 (2018), Article Number 8964.

However, a disadvantage of known methods for non-invasive determination of analytes is their susceptibility to error.

The present invention provides a device and a method for non-invasive determination of an analyte in a body fluid, by means of which the disadvantages of the prior art can be prevented, at least in part.

The invention is based on the finding that a simple, quick and sufficiently accurate quantitative determination of an analyte in the blood of a test subject, by means of non-invasive methods, is possible. The present invention is based on the acquisition of radiation from the body region, to be examined, of a test subject, in two different wavelength regions, and combined evaluation of the measuring signals obtained. For this purpose, a predetermined body region of the test subject, e.g. a fingertip, is irradiated with terahertz radiation, and the reflected terahertz radiation, in a wavelength range in which the intensity of the reflected terahertz radiation changes in a manner dependent on the concentration of the analyte to be determined, is acquired.

In addition, the body's own IR radiation originating from a predetermined body region of the test subject, e.g. a fingertip, is acquired separately in at least two different wavelengths or wavelength ranges in the wavelength region of from approximately 0.7 µm to approximately 20 µm, and in particular from approximately 8 µm to approximately 12 µm. The acquisition takes place at a first wavelength or a first wavelength range, where the intensity of the reflected IR radiation is substantially independent of the concentration of the analyte to be determined, and, irrespective thereof, at a second wavelength or a second wavelength range, where the intensity of the reflected IR radiation changes in a manner dependent on the concentration of the analyte to be determined. The concentration of the analyte can be determined by means of differential evaluation of the measuring signals of both IR wavelengths or IR wavelength ranges, in combination with an evaluation of the measuring signals in the terahertz range.

It was surprisingly found that the non-invasive determination of analytes in the blood, by combined acquisition and evaluation of radiation from two different spectral ranges, improves the accuracy of the analyte determination, and reduces the susceptibility to errors. In particular, in this way the influence of interfering substances can be reduced, since such interfering substances typical exhibit an absorption behaviour that interferes with glucose only in one of the two spectral ranges. As a result it is possible, using suitable algorithms, to quantitatively determine the contribution of the relevant interfering substance to the measuring signal, such that exact correction is possible.

In one embodiment of the invention, by means of the combined determination in the terahertz and IR range, the contribution of an interfering substance in the IR measuring signal is determined in a quantitative manner by evaluation of the terahertz signal, as a result of which a corrected IR measuring signal is obtained, from which the contribution of the interfering substance is at least largely, or completely, eliminated.

In a further embodiment of the invention, by means of the combined determination in the terahertz and IR range, the contribution of an interfering substance in the terahertz measuring signal is determined in a quantitative manner by evaluation of the IR signal, as a result of which a corrected terahertz measuring signal is obtained, from which the contribution of the interfering substance is at least largely, or completely, eliminated. In yet another embodiment of the invention, by means of the combined determination in the terahertz and IR range, the contribution of a first interfering substance in the terahertz measuring signal is determined in a quantitative manner by evaluation of the IR signal, and the contribution of a second interfering substance in the IR measuring signal is determined in a quantitative manner by evaluation of the terahertz signal, as a result of which corrected terahertz and IR measuring signals are obtained, from which the contributions of the first and the second interfering substance are at least largely, or completely, eliminated.

Unless otherwise specified, within the context of the present invention the term "terahertz range" means a frequency range of from approximately 60 gigahertz (GHz) to approximately 3 terahertz (THz), corresponding to a wavelength range or a wavelength region of from approximately 5 mm to approximately 0.1 mm, or a sub-range thereof. For example, the frequency range can extend from approximately 0.3 THz to approximately 3 THz (corresponding to a wavelength range or a wavelength region of from approximately 1 mm to approximately 0.1 mm), or from approximately 60 GHz to approximately 2.5 THz (corresponding to a wavelength range or a wavelength region of from approximately 5 mm to approximately 0.12 mm).

Unless otherwise specified, within the context of the present invention the term "IR range" means a wavelength range or a wavelength region of from approximately 0.7 μm to approximately 20 μm, or a sub-range thereof. For example, the wavelength range or the wavelength region can extend from approximately 1 μm to approximately 20 μm, from approximately 5 μm to approximately 15 μm, and in particular from approximately 8 μm to approximately 12 μm.

In this case, the body region to be examined is irradiated using terahertz radiation, and the reflected terahertz radiation is acquired using sensors suitable therefor. Furthermore, the IR radiation emitted by the body is acquired using sensors suitable therefor. In this case, the use of external IR radiation sources is typically not provided. In order to evaluate the measuring signals, expediently a device is used which is shielded from external electrical and/or thermal radiation. A significant increase in the measuring accuracy is achieved thereby.

Within the context of the evaluation, furthermore a measurement of the temperature of the body region to be examined, e.g. a fingertip, takes place and the temperature of the sensors used for acquiring terahertz radiation and IR radiation, the temperature of the sensors being kept at a value which is lower than the temperature of the body region to be examined. Expediently, the temperature of the sensors is set to a predetermined value, e.g. in the range of from 10° C. to 25° C., e.g. by means of embedding in a metal block, the temperature of which is regulated by a temperature adjustment element, e.g. a Peltier element, and is determined exactly, e.g. at a precision of at most ±0.1° C. or of at most ±0.01° C., using a temperature measuring element. The temperature of the body region to be examined, e.g. a fingertip, may, depending on the test subject and the external conditions, assume a variable value which, according to the invention, is determined accurately, using a temperature measuring element, e.g. at a precision of at most ±0.1° C. or of at most ±0.01° C.

The evaluation of the measuring signal comprises temperature compensation of the obtained measuring signals, taking into account the value for the temperature of the body region to be examined, and the value for the temperature of the sensor unit and in particular the temperature difference resulting therefrom. Consequently, the present invention relates to a device and a method for the non-invasive determination of an analyte by combined evaluation of terahertz radiation and the body's own IR radiation with temperature compensation.

Furthermore, according to the present invention, a selective evaluation of the body's own IR radiation in the region of from approximately 0.7 μm to approximately 20 μm or from approximately 8 μm to approximately 12 μm, from blood vessels of the body region to be examined that are close to the surface, in particular a selective evaluation of the body's own IR radiation from the capillary blood vessels of the dermis, can take place. The inventors have now found that the body's own IR radiation is composed of a plurality of components which can be analysed separately. The component of the body's own IR radiation originating from the blood vessels close to the surface has a temporal variation that is dependent on the arterial pulse frequency of the test subject. On account of this variation, it is possible to distinguish between signals that change with the pulse frequency and signals independent of the pulse frequency, within the context of the evaluation.

Surprisingly, the present invention allows for accurate and reproducible determination of analytes in blood, e.g. at an accuracy of ±2.5% with respect to a reference measurement by means of an x-ray diffractometer.

A first aspect of the present invention thus relates to a device for non-invasive determination of an analyte in the blood of a test subject, the device comprising:
 (a) a unit for receiving a body region to be examined, originating from the test subject,
 (b) a radiation source for generating terahertz radiation, in particular terahertz radiation in a wavelength region of from approximately 0.1 mm to approximately 5 mm, from approximately 0.12 mm to approximately 5 mm, or from approximately 0.1 mm to approximately 1 mm, for irradiating the body region to be examined,
 (c) a unit for acquiring radiation from the body region to be examined, comprising:
  (i) a unit for acquiring reflected terahertz radiation from the body region to be examined, which unit is designed for acquiring terahertz radiation in a wavelength range in which the intensity of the reflected terahertz radiation changes in a manner dependent on the concentration of the analyte to be determined,
  (ii) a unit for acquiring the body's own IR radiation from the body region to be examined, which unit is designed for separate acquisition of IR radiation in at least two different wavelengths or wavelength ranges in the wavelength region of from approximately 0.7 μm to approximately 20 μm, from approximately 5 μm to approximately 15 μm, or from approximately 8 μm to approximately 12 μm,
  at a first wavelength or a first wavelength range the intensity of the body's own IR radiation being substantially independent of the concentration of the analyte to be determined, and
  at a second wavelength or a second wavelength range the intensity of the body's own IR radiation changing in a manner dependent on the concentration of the analyte to be determined, and
  the unit being optionally additionally designed for unspecific acquisition of the body's own IR radiation, and
 (d) (i) an element for measuring the temperature in the body region to be examined, (ii) optionally an element for adjusting the temperature in the body region to be examined, (e) (i) an element for measuring the temperature in the acquisition unit (c), (ii) an element for adjusting the temperature in the acquisition unit (c), it being provided for the temperature in the acquisition unit (c) to be lower than the temperature in the body region to be examined, and (f) a unit which is designed for temperature-compensated evaluation of the signals originating from the acquisition unit (c), and for determining the concentration of the analyte on the basis of the evaluated signals, the unit being optionally additionally designed for selective evaluation of the body's own IR radiation, which originates from capillary blood vessels of the dermis of the body region.

The device according to the invention contains a radiation source (b) for generating terahertz radiation, in particular terahertz radiation in a wavelength region of from approximately 0.1 mm to approximately 5 mm, from approximately 0.12 mm to approximately 5 mm, or from approximately 0.1 mm to approximately 1 mm, for irradiating the body region to be examined. Following irradiation of the body region to be examined, which is introduced into the receiving unit (a), terahertz radiation is reflected. The device according to the invention furthermore contains a unit (c) (ii) for acquiring terahertz radiation.

The device according to the invention does not necessarily contain an external IR radiation source, since it is designed for acquiring and evaluating the body's own IR radiation. Preferably no external IR radiation source is provided. The body's own IR radiation is emitted by the body region to be examined, which is introduced into the receiving unit (a). The device according to the invention contains a unit (c) (ii) for acquiring the body's own IR radiation.

The temperature, in particular the core temperature, of the body region to be examined, which is introduced into the receiving unit, is determined exactly, by means of an element for temperature measurement (d) (i), e.g. a temperature sensor. Optionally, an element (d) (ii) for adjusting the body temperature of the body region to be examined, i.e. a heating and/or cooling element, e.g. a Peltier element, can be provided in the receiving unit (a).

The device furthermore contains means (e) (i) for determining the temperature in the unit for acquiring reflected terahertz radiation (c) (i) and/or the unit for acquiring the body's own IR radiation (c) (ii), e.g. a temperature sensor, and means (e) (ii) for keeping the temperature in the unit for acquiring reflected terahertz radiation (c) (i) and/or the unit for acquiring the body's own IR radiation (c) (ii) at a substantially identical and preferably constant temperature level. In this case, the element (e) (ii) is intended for precise adjustment of the temperature of the radiation acquisition unit (c) (i) and/or (c) (ii) to a value which is lower than the value of the body temperature. Expediently, the element (e) (ii) contains a body made of a thermally conductive material, e.g. a metal block, and means for supplying and/or removing heat, e.g. a heating and/or cooling element, such as a Peltier element.

The device according to the invention is intended for receiving a body region of a test subject, in particular for receiving a body region of a human test subject, e.g. a fingertip, an earlobe, or a heel, or parts thereof, in order to determine the body's own IR radiation emitted therefrom. The body region to be examined is preferably a fingertip.

For this purpose, the device contains a unit (a) for receiving the body region to be irradiated, which may for example comprise a support element for the relevant body region, e.g. the fingertip. The shape of the support element is adapted to the body region on which the determination is carried out. Thus, for example, a substantially planar support element can be provided.

Expediently, the support element (a) is thermally insulated with respect to the radiation acquisition unit (c) (i) and/or (c) (ii), in part, e.g. in that it is formed, at least in part, of thermally insulating material, e.g. a plastics material such as a polyurethane foam. The support element furthermore contains one or more regions which are transparent for terahertz radiation in the region of from preferably approximately 0.1 mm to approximately 5 mm, from approximately 0.12 mm to approximately 5 mm, or from approximately 0.1 mm to approximately 1 mm, and for IR radiation in the region of from preferably approximately 0.7 μm to approximately 20 μm, from approximately 5 μm to approximately 15 μm, and preferably from approximately 8 μm to approximately 12 μm, in order to allow for unimpeded penetration of the terahertz and IR radiation emitted from the body region to be examined. The transparent region of the support element can for example have a surface area of approximately 0.5 cm$^2$ to approximately 1.5 cm$^2$ and for example be circular. Examples for suitable materials in the transparent region of the support element are silicon, germanium or organic terahertz-transparent and IR-transparent polymers. The support element can be designed in any suitable shape, for example as a disc.

An element (d) (i) for measuring the temperature in the body region to be examined is connected to the receiving unit (a). Said element comprises a temperature sensor, e.g. a bolometer or thermopile. Furthermore, a temperature adjustment element (d) (ii) can be provided, e.g. a heating and/or cooling element, in particular a Peltier element, in order to optionally allow for precise adjustment of the temperature of the body region to be examined, e.g. at a precision of at most ±0.1° C. or of at most ±0.01° C. For example, the temperature adjustment element can be designed such that a temperature of the body region of 25° C. or more, e.g. of approximately 28-38° C., can be set. Furthermore, an element for measuring the pigmentation of the body region (d) (iii) to be determined, e.g. a colorimetric sensor, can be provided.

The support element preferably comprises means, e.g. sensors, for acquiring and/or monitoring the contact position and/or the contact pressure for the body region to be examined. In this case, the contact position and/or the contact pressure can be acquired individually for each body region, and optionally adapted. The individual adaptation can comprise for example one-off or repeated correlation of the measuring signal originating from the non-invasive device according to the invention with a reference signal which was obtained in a conventional manner, e.g. by means of invasive determination using a conventional test strip or a sensor inserted in the body. This correlation can take place within the context of the first use of the device according to the invention and, if necessary, be repeated at time intervals, e.g. daily, every second day, weekly, etc. The correlation preferably comprises an adjustment of the contact position and/or contact pressure for the body region to be examined, in order to obtain a stable reproducible measuring signal which corresponds, as far as possible, to the reference signal. For this purpose, the device can contain sensors for acquiring and/or monitoring the contact position of the body region to be irradiated, e.g. in view of the x-, y- and z-coordinates with respect to the support element, and/or for acquiring and/or monitoring the contact pressure, e.g. in a range of approximately 0.5-100 N, preferably in a range of approximately 10-50 N, and particularly preferably approximately 20 N. A sensor for acquiring and/or monitoring the contact pressure can for example contain a load cell. A sensor for acquiring and/or monitoring the contact position can contain a camera, e.g. a CCD camera and/or a pulse sensor.

The adjustments, determined by adaptation, for the contact position and/or contact pressure, are preferably registered and stored in the device. In the case of subsequent use of the device, the correct contact position or the correct contact pressure can then be indicated by a signal, e.g. by an optical and/or acoustic signal. The measurement of the analyte to be determined is only started when the predetermined correct adjustments have been verified.

The device according to the invention contains a radiation source (b) for generating terahertz radiation. Said radiation source can be designed for generating coherent terahertz radiation. Thus, terahertz radiation can be generated by frequency multiplication or difference frequency formation from a plurality of laser signals, e.g. distributed feedback lasers, by quantum cascade lasers, molecular gas lasers, free-electron lasers, optical parametric oscillators, and backward wave oscillators. Furthermore, photodiodes can be used, which convert the difference frequency of two lasers into alternating current which is emitted by a suitable photoconductive antenna in the form of terahertz radiation. In particular embodiments of the present invention, terahertz radiation by a pulsed laser, e.g. having a wavelength in the range of 500-2000 mm, e.g. 800 mm, can be converted, by a suitable terahertz antenna, into terahertz radiation. The power of a laser of this kind is typically approximately 1 mW to approximately 1 W.

In a further embodiment, a terahertz transceiver chip can also be used. A transceiver chip of this kind can be produced from silicon-based and/or germanium-based materials. In particular embodiments, the chip contains one or more amplifiers, e.g. a low noise amplifier (LNA), one or more quadrature mixers, one or more polyphase filters, one or more frequency dividers, and/or an oscillator comprising at least one tuning input for generating terahertz radiation. Expediently a plurality of, e.g. 2, 3 or 4, tuning inputs, are provided, in order to vary the bandwidth of the terahertz radiation as required. Furthermore, transmission and/or reception antennae for radiating and/or receiving terahertz radiation can be integrated on the chip. The power of a chip of this kind can be in the range of from approximately 0.01 mW to approximately 100 mW, in particular from approximately 0.1 mW to approximately 1 mW. For example, the chip can have a power of approximately 1 mW. The size of a chip of this kind can be approximately in the region of up to approximately 100 $mm^2$, expediently approximately 10 $mm^2$ to approximately 50 $mm^2$, for example approximately 25 $mm^2$. Terahertz chips of this kind can be obtained for example from Silicon Radar GmbH.

In a further embodiment of the invention, a terahertz antenna is provided, e.g. a patch antenna or a dipole antenna.

The effective power of the terahertz radiation source, i.e. the power radiated onto the body region to be examined, is preferably approximately 1 mW to approximately 100 mW, it being possible for the radiation to be emitted continuously or in a pulsed manner.

The device furthermore contains a unit (c) for acquiring radiation, specifically a unit for acquiring terahertz radiation (c) (i) and a unit for acquiring IR radiation (c) (ii).

The acquisition unit (c) (i) for acquiring terahertz radiation contains one or more sensors or detectors which are provided for acquiring terahertz radiation, in particular terahertz radiation in the frequency range of from approximately 60 gigahertz (GHz) to approximately 3 terahertz (THz), corresponding to a wavelength range or a wavelength region of from approximately 0.1 mm to approximately 5 mm, or in a sub-range thereof, e.g. in the range of from approximately 0.12 mm to approximately 5 mm, from approximately 0.1 mm to approximately 1 mm, or a sub-range thereof.

In a further particularly preferred embodiment, at least one focusing lens is provided in the beam path between the terahertz radiation source and the body region to be examined, and/or in the beam path between the body region to be examined and the terahertz acquisition unit (c) (i), e.g. a spherical lens, an aspherical lens, or a Fresnel lens, which consists of a material that is substantially transparent for terahertz radiation, such as polypropylene or HD polyethylene. The lens serves for focusing the terahertz radiation, radiated into the body region to be examined, from the terahertz radiation source, at a predetermined penetration depth into the body region, e.g. of approximately 3-4 mm, and/or for focusing the terahertz radiation reflected from the body region to be examined onto the terahertz acquisition unit.

The terahertz radiation reflected by the body can be amplified in one or more steps, before it is directed to the acquisition unit (c) (i). The amplification typically takes place in a first step using an LNA. Subsequently, the reflected terahertz radiation can be guided to a mixer and mixed (multiplied) with a transmission signal. The mixing result can subsequently be amplified further. For example, an amplification by a factor of $10^3$ or more, $10^4$ or more, and up to $10^6$ or $10^7$ can take place. In one embodiment, the signal can be amplified in a plurality of, e.g. in two, steps, it being possible for a signal amplification by a factor of from $10^2$ to $10^3$ to take place in each step.

The unit for acquiring terahertz radiation is designed for acquiring terahertz radiation in a wavelength range in which the intensity of the reflected terahertz radiation changes in a manner dependent on the glucose concentration. In particular the unit (c) (i) is for acquiring a broadband spectrum in the terahertz range, in particular comprising a frequency range of from approximately 60 gigahertz (GHz) to approximately 3 terahertz (THz), corresponding to a wavelength range or a wavelength region of from approximately 0.1 mm to approximately 5 mm, e.g. a wavelength range of from approximately 0.1 mm to approximately 0.25 mm (corresponding to a wavenumber range of from approximately 100 $cm^{-1}$ to approximately 40 $cm^{-1}$, or a sub-range thereof.

The result of the terahertz measurement can be displayed separately or combined with the result of the IR measurement, from a display.

The device furthermore contains a unit (c) (ii) for acquiring the body's own IR radiation from the body region to be examined, which unit is designed for separate acquisition of IR radiation in at least two different wavelengths or wavelength ranges in the region of from approximately 0.7 µm to approximately 20 µm, from approximately 5 µm to approximately 15 µm, or from approximately 8 µm to approximately 12 µm. In a particularly preferred embodiment, said unit is designed for separate acquisition of IR radiation in at least two different wavelengths or wavelength ranges in the region of 8-10 µm.

The acquisition unit (c) (ii) for acquiring IR radiation contains one or more sensors which are provided for acquiring IR radiation.

In one embodiment, the acquisition unit (c) (ii) contains a plurality of sensors which are provided for separate acquisition of IR radiation having at least two different wavelengths or wavelength ranges. In another embodiment, the device can in turn contain a sensor which is provided for time-dependent separate acquisition of IR radiation having at least two different wavelengths or wavelength ranges.

In this case, the acquisition unit (c) (ii) is designed for separate acquisition of IR radiation in at least one first wavelength or one first wavelength range, and in at least one second wavelength or at least one second wavelength range. The first wavelength or the first wavelength range is preferably in the region of an absorption minimum for the analyte to be determined. The second wavelength or the second wavelength range is preferably in the region of an absorption band of the analyte to be determined, i.e. in a region in which the analyte exhibits a high degree of absorption, preferably an absorption maximum.

In one embodiment the device contains at least one first sensor and at least one second sensor, which are in each case designed for separate acquisition of IR radiation having different wavelengths or wavelength ranges in the region of from approximately 0.7 μm to approximately 20 μm or in a sub-range thereof, from approximately 1 μm to approximately 20 μm, from approximately 5 μm to approximately 15 μm, and in particular from approximately 8 μm to approximately 12 μm. In this case, a first sensor is selected such that it is designed for acquiring IR radiation having a first wavelength or a first wavelength range, where the intensity of the body's own IR radiation is substantially independent of the concentration of the analyte to be determined. A second sensor is selected such that it is designed for acquiring IR radiation having a second wavelength or a second wavelength range, where the intensity of the body's own IR radiation changes in a manner dependent on the concentration of the analyte to be determined.

The device according to the invention can in each case contain one or more first and second IR sensors. In a specific embodiment, the device contains a first sensor which is designed for acquiring IR radiation, the intensity of which is independent of the concentration of the analyte to be determined, and two or more second sensors which are designed for acquiring IR radiation, the intensity of which changes in a manner dependent on the concentration of the analyte to be determined, the two or more second sensors being designed for acquiring IR radiation having different wavelength ranges in each case.

The first and/or second IR sensors can be designed as wavelength-unspecific radiation sensors, for example as bolometers or thermopiles, which are equipped with optical filter elements which are permeable for a wavelength or a wavelength range to be acquired in each case, in order to thereby allow for a wavelength (range)-specific acquisition of the IR radiation. For this purpose, suitable filter elements, e.g. bandpass, highpass, or lowpass filter elements, or combinations of a plurality of such filter elements, can be used. The optical filter elements are preferably arranged such that they rest directly, i.e. without any gap, on the sensors. In a preferred embodiment, high-precision bolometers or thermopiles are used as the first and/or second sensor.

In one embodiment, for the purpose of wavelength-specific acquisition of IR radiation, the first and/or the second IR sensor may be equipped with narrow bandpass filter elements, which have a permeability width of in each case e.g. up to 0.8 μm, up to 0.6 μm, up to 0.4 μm, up to 0.3 μm or up to 0.2 μm around the first or second measuring wavelength.

In yet a further embodiment, the filter elements of the first and/or of the second IR sensor can comprise combinations of further bandpass filter elements having a permeability width of e.g. 2-12 μm, preferably 3-8 μm, highpass filter elements, and/or lowpass filter elements. Thus, a further bandpass filter element may be provided which is permeable for IR radiation in a region that covers the entire measuring wavelength range, for example in a region of 8-10.5 μm or 7-14 μm. Said bandpass filter element can be used in combination with lowpass and/or highpass filter elements, in order to allow for separate acquisition of IR radiation of different wavelengths or wavelength ranges, for the first and second sensor, in each case. In this case, one of the two sensors can contain a lowpass filter element which is permeable for IR radiation down to a threshold wavelength which is between the first wavelength or the first wavelength range, and the second wavelength or the second wavelength range. Alternatively or in addition, the other of the two sensors can contain a highpass filter element which is permeable for IR radiation up to a second threshold wavelength which is also between the first measuring wavelength or the first measuring wavelength range, and the second measuring wavelength or the second measuring wavelength range.

The advantage of using wide bandpass filters in combination with a lowpass and/or highpass filter is that wider wavelength ranges can be acquired. In this way, the efficiency of the measurement can be significantly increased.

In a specific configuration of this embodiment, one of the two IR sensors can contain a wide bandpass filter in combination with a lowpass filter, and the other of the first or second sensors can contain a wide bandpass filter in combination with a highpass filter. In a second embodiment, one of the first or second IR sensors can optionally contain only a wide bandpass filter, and the other of the first or second sensors can contain the combination of a bandpass filter with a lowpass filter, or alternatively the combination of a bandpass filter with a highpass filter. In the two latter embodiments, the wavelength ranges acquired by the first or second sensors overlap, such that said overlapping region has to be subtracted out during the evaluation.

In yet another embodiment, the first IR sensors and/or the second IR sensors can also be designed as wavelength (range)-specific sensors, for example as quantum cascade sensors.

In another embodiment, the acquisition unit (c) (ii) contains at least one IR sensor which is designed for time-dependent separate acquisition of IR radiation having at least two different wavelengths or wavelength ranges in the region of from approximately 0.7 μm to approximately 20 μm, from approximately 1 μm to approximately 20 μm, from approximately 5 μm to approximately 15 μm, and in particular from approximately 8 μm to approximately 12 μm, the intensity of the body's own IR radiation being substantially independent of the concentration of the analyte to be determined, at a first wavelength or a first wavelength range, and the intensity of the body's own IR radiation changing in a manner dependent on the concentration of the analyte to be determined, at a second wavelength or a second wavelength range.

In this case, the sensor provided for time-dependent separate acquisition of radiation having different wavelengths or wavelength ranges can be designed as a Fabry-Perot interferometer, for example as a MEMS spectrometer for the MIR/TIR range of approximately 3-12 μm (see e.g. Tuohinieni et al., J. Micromech. Microeng. 22 (2012), 115004; Tuohinieni et al., J. Micromech. Microeng. 23 (2013), 075011).

In addition, the acquisition unit (c) (ii) can optionally also contain at least one further sensor, e.g. a bolometer or thermopile, which is designed for unspecific acquisition of the body's own IR radiation from the irradiated body region of the test subject, and can be used for referencing, e.g. for referencing of the body temperature. Said further sensor can also exercise the function of the temperature measuring element (d) (i).

The size of the sensors in the acquisition units (c) (i) and/or (c) (ii) of the device according to the invention can be selected as required. For example, they can have a cross-sectional area in the range of 0.5-10 mm$^2$.

One or more sensors can optionally be provided in the form of an array consisting of a plurality of individual sensor elements such as bolometers or thermopiles, for example having 4-100 individual elements in an arrangement of for example 2×2, 3×3, 4×4 or 8×8 individual elements, it being possible for the individual sensor elements, within an array, to be arranged so as to be directly adjacent to one another or to be separated from one another by gaps.

The sensors of the device according to the invention, in particular the sensors of the acquisition units (c) (i) and (c) (ii), are expediently in a state of thermal equilibrium, i.e. they are of substantially the same temperature level. For example, the sensors can be in contact with a common thermally conductive carrier, such as a body, a block, a plate, or a foil made of metal, e.g. copper or tin, e.g. by being embedded therein. The sensors can thus be arranged in depressions of a body or a block, it being possible, in each case, for one sensor to be arranged in one depression, or for a plurality of sensors to be arranged in one depression. The carrier or block can in turn be connected to an element for supplying and/or removing heat, e.g. a heating and/or cooling element, such as a Peltier element.

In a preferred embodiment, the sensors, in particular the sensors of the acquisition units (c) (i) and (c) (ii), are embedded in a metal block, e.g. in a copper block, which is optionally coated with gold.

A particularly preferred embodiment can contain 3 or 4 or more sensors, which are for example arranged together in a depression of a metal block, it being possible for each of said sensors to be designed as an array of a plurality of individual sensor elements, e.g. 8×8 individual elements. One of said sensors is provided for acquisition of IR radiation in the region of an absorption minimum of the analyte to be determined, one or two of said sensors are provided for acquiring IR radiation in the region of an absorption band of the analyte to be determined. Optionally, a further sensor can be provided, which is used for referencing.

In yet another embodiment, the sensors of the acquisition unit (c) (ii), i.e. the IR sensors, are in a state of thermal equilibrium, while the sensors of the acquisition unit (c) (i), i.e. the terahertz sensors, are uncooled.

An element (d) (i) for measuring the temperature of the radiation acquisition unit (b) and an element (d) (ii) for adjusting the temperature thereof, in particular the temperature in the region of the sensors, are connected to said unit. The element for temperature measurement (d) (i) can be designed for example as a temperature sensor. For example, an infrared calibrator or black body can be used as the element for temperature measurement. The element for temperature adjustment (d) (ii) can be designed for example as a heating and/or cooling element, in particular as a Peltier element.

The cooling side of the element for temperature adjustment, e.g. the Peltier element, preferably faces the radiation acquisition unit (c), and said element preferably comprises, on the heating side thereof remote from the radiation acquisition unit (c), a heat sink, e.g. one or more heat pipes or thermosiphons. The element for temperature adjustment is designed to provide a value for the temperature, in the acquisition unit (c) and in particular in the region of the terahertz and IR sensors, which is lower than the value for the temperature, in particular for the core temperature of the body region to be examined, e.g. the fingertip. The temperature in the acquisition unit is preferably set to a value in a range of from 10° C. to 25° C. and determined by means of an element for temperature measurement. Temperature adjustment and temperature measurement in the acquisition unit are expediently performed at a precision of at most ±0.1° C. or of at most ±0.01° C. The measurement of the temperature of the body region to be examined is also expediently performed at a precision of at most ±0.1° C. or of at most ±0.01° C. The temperature difference between the terahertz and IR sensors of the acquisition unit and of the body region to be examined can therefore be determined at a high degree of precision, e.g. of at most ±0.2° C. or of at most ±0.02° C., and is expediently 1° C. or more, e.g. 2° C. or more, 3° C. or more, 4° C. or more, 6° C. or more, 7° C. or more, or 8° C. or more. A range of the temperature difference of from approximately 4° C. to approximately 40° C. is preferred, particularly preferably approximately 6° C. to approximately 35° C.

In one embodiment, optical focusing elements, e.g. lens elements, are arranged in the beam path between the body region to be examined and the acquisition unit (c), in order to allow for focusing of the terahertz radiation radiated in, the reflected terahertz radiation and/or the body's own IR radiation, on the sensor or the sensors of the acquisition unit (c), that is as punctiform as possible.

For example, the sensors of the acquisition unit, i.e. the IR and/or terahertz sensors, e.g. the first and/or second sensor, can be equipped with optical focusing elements, e.g. plano-convex lenses or biconvex lenses, in particular spherical lenses, made of IR-transparent materials such as germanium or zinc selenide, the lens diameter expediently being matched to the diameter of the sensor. Using an optical assembly having a focused beam path makes it possible for the radiation output, and thus the sensitivity and precision of the measurement, to be increased. The use of sensors, e.g. bolometers or thermopiles, which are equipped with biconvex lenses, in particular spherical lenses, is particularly preferred.

The device according to the invention can be used for determining analytes which have characteristic absorption bands in the terahertz range, in particular in the above-mentioned wavelength regions, e.g. in the regions of from approximately 0.1 mm to approximately 5 mm, from approximately 0.12 mm to approximately 5 mm, or from approximately 0.1 to approximately 1 mm, and in the IR range, in particular in the above-mentioned wavelength regions, e.g. in the regions of from approximately 0.7 μm to approximately 20 μm, and in particular 8-12 μm. Examples for such analytes are glucose or other clinically relevant analytes such as alcohol, lactate, protein and urea.

In a particularly preferred embodiment, the device according to the invention is designed for the non-invasive determination of an analyte, in particular an analyte different from glucose, in blood, in particular in the capillary blood of the dermis.

A further aspect of the invention is therefore the use of the device for non-invasive determination of an analyte, in particular an analyte different from glucose, in particular for the quantitative determination of an analyte, in particular an analyte different from glucose, in the blood of a test object.

For the determination of glucose, the terahertz wavelength region in particular includes a range of from approximately 0.1 mm to approximately 5 mm, from approximately 0.12 mm to approximately 5 mm, or from approximately 0.5 mm to approximately 1 mm, or a sub-range thereof. In this range, the glucose has a plurality of absorption bands, three absorption bands being located at approximately 0.2 mm (corresponding to a wavenumber of 50 cm-1), at approximately 0.14-0.17 mm (corresponding to a wavenumber of 60-70 cm-1), and at approximately 0.13 mm (corresponding to a wavenumber of 80 cm-1). The determination of glucose preferably acquires the acquisition of a broadband spectrum which comprises at least 2 and expediently all 3 of the above-mentioned absorption bands.

In the IR wavelength region, the determination of glucose comprises a first IR wavelength or a first IR wavelength range having an absorption minimum of glucose, and a second wavelength or a second wavelength range having an absorption band of glucose or a part thereof. For example, the first wavelength can be located in the region of 8.1±0.3 µm and/or 8.5±0.3 µm, of 8.1±0.2 µm and/or 8.5±0.2 µm or of 8.1±0.1 µm, and/or 8.5±0.1 µm, or at least include one of said regions. In said wavelength regions, glucose exhibits an absorption minimum. The second wavelength can be located in the region of 9.1±0.3 µm, 9.3±0.3 µm and/or 9.6±0.3 µm or of 9.1±0.2 µm, 9.3±0.2 µm and/or 9.6±0.2 µm or of 9.1±0.1 µm, 9.3±0.1 µm and/or 9.6±0.1 µm, or at least include one of said regions. In said wavelength regions, glucose exhibits an absorption band having a plurality of absorption maxima.

In a preferred embodiment, the absorption of glucose is measured at two different wavelengths or wavelength ranges, which include an absorption band of glucose or a part thereof, e.g. in the region of 9.3 µm and in the region of 9.6 µm.

A further component of the device according to the invention is a unit (f) for temperature-compensated evaluation of the signals originating from the acquisition unit (c) (i) and (c) (ii), and for determining the concentration of the analyte on the basis of the evaluated signals. Expediently, a combined evaluation of the signals from the terahertz acquisition unit (c) (i) and the IR acquisition unit (c) (ii) takes place. A plurality of expedient effects can be achieved by combined evaluation of the signals from the terahertz and the IR range. Firstly, weak signals can be amplified, as a result of which interference within the context of the measurement can be reduced, and possible measurement inaccuracies can be identified and corrected. Secondly, signals from interfering substances which have absorption bands, in one of the two measuring regions, which overlap with those of the analyte, can be identified and eliminated.

In a preferred embodiment, the acquisition unit (c) is designed for sequential acquisition of terahertz radiation and IR radiation, in particular initially acquisition of the body's own IR radiation without irradiation of the body region to be examined being performed, and subsequently irradiation, of the body region to be examined, with terahertz radiation, and acquisition of the reflected terahertz radiation, being performed.

The evaluation of the terahertz signals is based on plotting of a broadband spectrum of the analyte over a predetermined wavelength range in the terahertz region, which contains at least one absorption band, expediently at least 2 or 3 absorption bands, of the analyte. The intensity of said absorption band(s) is dependent on the concentration of the relevant analyte in the blood of the test subject. The width of the wavelength range is expediently approximately at least 0.05 mm or at least 0.1 mm, and up to 0.2 mm or more.

The evaluation of the IR signals is based on the body's own IR radiation, at a wavelength or a wavelength range from an absorption minimum of the analyte, e.g. glucose, being independent of the analyte concentration in the blood of the test subject. In contrast, the body's own IR radiation having a wavelength or a wavelength range from an absorption band of the analyte is in turn dependent on the concentration of the relevant analyte in the blood of the test subject.

On the basis of the differential signal of the first and second IR sensor, it is possible, in conjunction with the signal of the terahertz sensor, to perform a sufficiently accurate determination of the analyte concentration, when the signals are evaluated under temperature compensation, in particular taking into account the temperature values for the body region to be examined and for the sensors of the radiation acquisition unit (c) which are measured and optionally adjusted by the elements (d) (i), (d) (ii), (e) (i) and/or (e) (ii). Furthermore, selective evaluation of IR radiation, originating from blood vessels, e.g. from blood vessels of the dermis and/or subcutis, preferably from capillary blood vessels of the dermis, can also be performed.

Yet a further component of the device according to the invention is a coating or a housing which brings about thermal insulation with respect to the surroundings. Suitable materials for this purpose are plastics materials that are not thermally conductive or are only slightly thermally conductive. In this case, the coating or the housing can be designed such that body region to be examined, introduced into the receiving unit (a), and/or the acquisition unit (c), are at least substantially electrically and/or thermally insulated from the surroundings, e.g. in that a stretchable sheath or membrane of a material that is not or only slightly electrically and/or thermally conductive is provided.

The inner surface of the measuring device can furthermore be entirely or in part coated or equipped with a material which is non-reflective for terahertz and/or IR radiation, and/or absorbs terahertz and/or IR radiation.

A further aspect of the invention is a method for non-invasive quantitative determination of an analyte in the blood of a test subject, comprising the steps of:
(i) irradiating a body region originating from the test object with terahertz radiation, in particular in a wavelength region of from approximately 0.1 mm to approximately 5 mm, from approximately 0.12 mm to approximately 5 mm, or from approximately 0.1 mm to approximately 1 mm, and acquiring reflected terahertz radiation by means of a unit for acquiring terahertz radiation from the irradiated body region in a wavelength range in which the intensity of the reflected terahertz radiation changes in a manner dependent on the concentration of the analyte to be determined,
(ii) separate acquisition of the body's own IR radiation from a body region originating from the test subject by means of a unit for acquiring IR radiation of at least one first wavelength or one first wavelength range in the wavelength region of from approximately 0.7 µm to approximately 20 µm, from approximately 1 µm to approximately 20 µm, from approximately 5 µm to approximately 15 µm, and in particular from approximately 8 µm to approximately 12 µm, where the intensity of the body's own IR radiation is substantially independent of the concentration of the analyte to be determined, and of at least one second wavelength or one second wavelength range in the wavelength region of from approximately 0.7 µm to approximately 20 µm, from approximately 1 µm to approximately 20 µm, from approximately 5 µm to approximately 15 µm, and in particular from approximately 8 µm to approximately 12 µm, where the intensity of the body's own IR radiation changes in a manner dependent on the concentration of the analyte to be determined, and optionally unspecific acquisition of the body's own IR radiation from the irradiated body surface region, for referencing, the temperature in the region of the unit for acquiring IR radiation being lower than the temperature of the body region to be examined, (iii) combined evaluation of the signals acquired according to (i) and (ii) taking account of the temperature of the body region to be examined and the temperature in the region of the units for acquiring terahertz radiation and IR radiation, and optionally selective evaluation of the body's own IR radiation from capillary blood vessels of the dermis of the body region taking place, and (iv) determining the concentration of the analyte on the basis of the evaluated signals.

The method is preferably performed by acquiring the body's own IR radiation from a fingertip of the test subject, and without using an external source for IR radiation, e.g. using the above-described device. The features specifically disclosed within the context of the device also relate to the method.

The device and the method are suitable in particular for determining an analyte different from glucose, in blood.

The present invention will be described again in greater detail in the following. Human skin consists, from outside to inside, of a plurality of layers, specifically the cuticle (epidermis) comprising the horn layer, keratinizing layer, and germinal layer, the cutis (dermis) comprising the papillary layer and the reticular layer, and the subcutaneous tissue (subcutis). The epidermis does not contain any blood vessels. The dermis contains fine capillary blood vessels which are connected to larger blood vessels in the subcutis. An arterial pulse is present in the region of the dermis crossed by capillary vessels, but not in skin layers thereabove, for example the epidermis.

Following irradiation of the skin surface with terahertz radiation, terahertz radiation is reflected from the irradiated body region, which radiation originates at least in part from the region of the dermis crossed by capillary vessels. IR radiation in the wavelength region of from approximately 0.7 µm to approximately 20 µm, from approximately 1 µm to approximately 20 µm, from approximately 5 µm to approximately 15 µm, and in particular 8-12 µm, irradiated from the skin surface, also originates at least in part from the region of the dermis crossed by capillary vessels. Substances located in this region and having absorption bands in the terahertz and IR region can absorb radiation in the region of said absorption bands, the extent of the absorption correlating with the concentration of the substance in question. The reflected terahertz radiation and the body's own IR radiation originate from different regions of the examined body region, radiation originating from the epidermis not exhibiting any dependency on the arterial pulse of the test subject.

In contrast, radiation originating from the region of the dermis crossed by capillary vessels exhibits a signal that is dependent on the arterial pulse of the test subject.

The radiation emitted from the body region to be examined is dependent on the temperature, in particular the core temperature of the examined body region. The signal of the radiation measured in a sensor is therefore likewise dependent on the temperature of the examined body region, but also on the temperature of the sensor itself, and therefore on the difference of the temperature, in particular the core temperature of the examined body region, and the temperature of the sensor used for acquiring the radiation.

Therefore, according to the present invention, a temperature-compensated evaluation of the measuring signal takes place, in which the temperature of the examined body region, the temperature of the sensors used for acquiring the terahertz and IR radiation, and the difference of the two temperatures, are taken into account. The measurement is performed under conditions in which the temperature of the examined body region is higher, for example at least 1° C. and preferably at least 6° C. higher, than the temperature of the sensors used for acquiring the body's own terahertz and IR radiation.

DETAILED DESCRIPTION

Figure 1A:
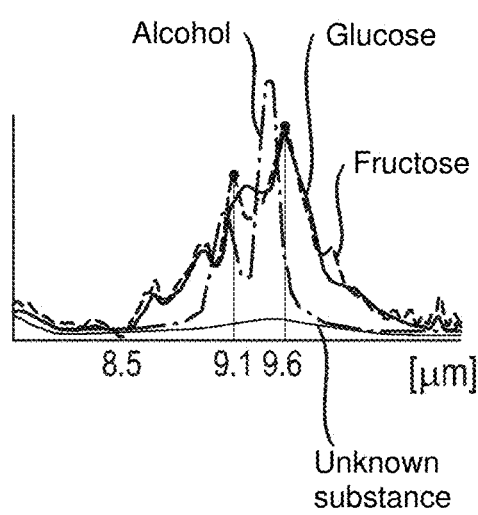
Fig. 1a shows the absorption spectra of alcohol, glucose, fructose, and an unknown substance in the IR wavelength range.
Figure 1B:
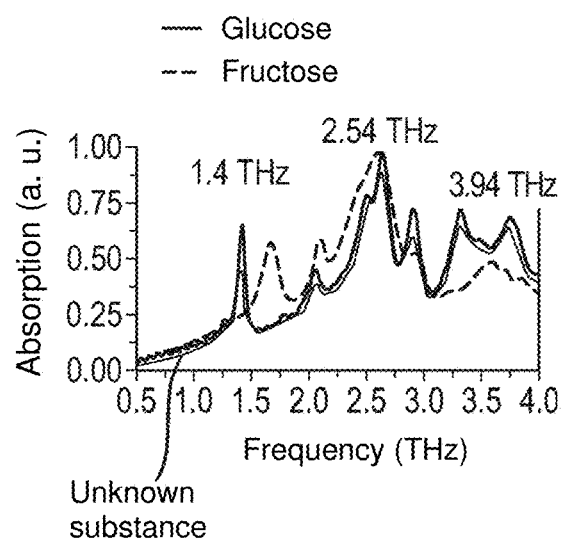
FIG. 1b shows the absorption spectra of alcohol, fructose, and an unknown substance in the terahertz wavelength range.

FIGS. 1a and 1b schematically show the advantages of a combined evaluation of measuring signals from the terahertz range and the IR range, as a result of which the accuracy of the measurement can be increased by improved association of the measuring signals with a specific analyte.

FIG. 1a shows the absorption spectra of alcohol (red), glucose (green), fructose (blue) and an unknown substance (yellow) in the IR wavelength range of from approximately 8 µm to approximately 10 µm. When using IR sensors (e.g. thermopiles) having a wavelength of 8.5 µm (reference wavelength) and 9.6 µm (analyte-specific wavelength), it is possible to reliably distinguish between glucose and the unknown substance. In contrast, distinguishing between glucose and fructose is difficult. FIG. 1b shows an absorption spectrum in the terahertz wavelength range of 400 µm to 100 µm (corresponding to a frequency of from 0.5 to 4.0 THz) of glucose (black), fructose (red; dotted) and the unknown substance (yellow). In the terahertz range, it is possible to reliably distinguish glucose and fructose, whereas the absorption spectra of glucose and the unknown substance overlap. In the case of a combination of the absorption spectra in the IR range and the terahertz range, an improved distinction of the individual substances is possible, which brings about an increase in the measuring accuracy.

Figure 2:
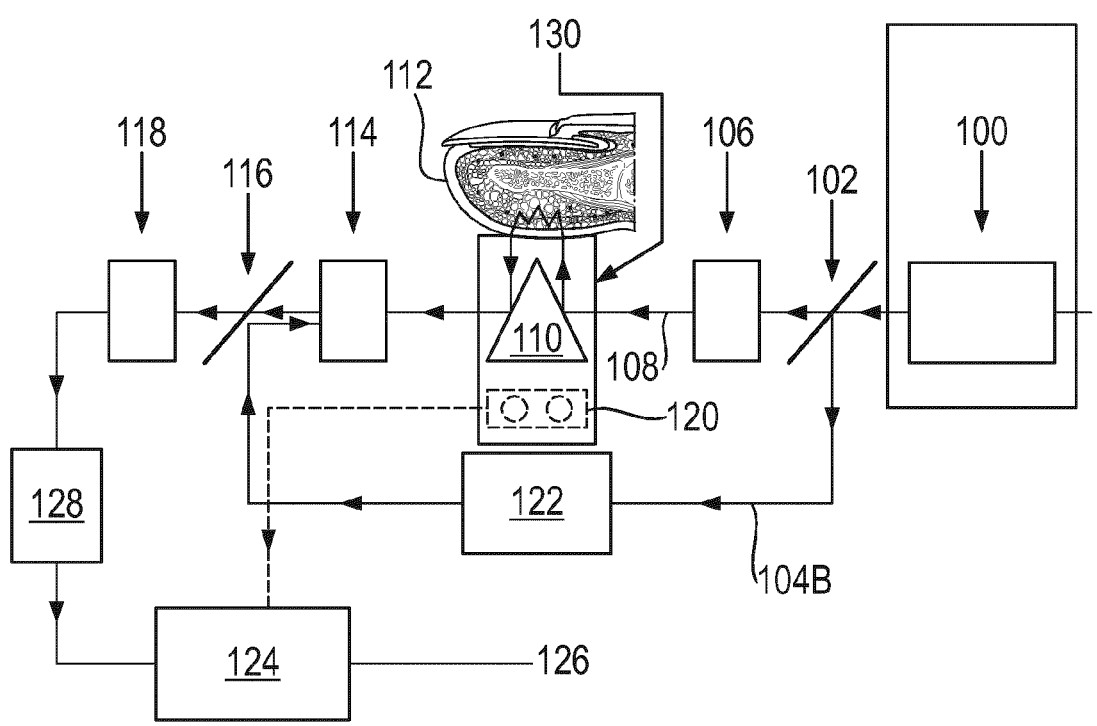
FIG. 2 is a schematic view of an embodiment of the device according to the invention.

FIG. 2 is a schematic view of an embodiment of the device according to the invention. The device contains a source for terahertz radiation (100), e.g. a femtosecond laser having a wavelength of 800 nm, the radiation of which is first guided through a semipermeable beam splitter (102) and is split, there, into partial beams (104a) and (104b). The partial beam (104a) is converted, in a mixer (106), e.g. a gallium arsenide crystal, into terahertz radiation (108), which is guided through an optical device (110), e.g. a prism (on a body region (112) to be examined, e.g. a fingertip. The radiation reflected out of the body region is guided via the optical element (110), a further mixer (114), e.g. a gallium arsenide crystal, and optionally a further semipermeable beam splitter (116), into a terahertz sensor (118), e.g. a photo diode, which is designed for acquiring a spectrum in the terahertz range. The partial beam (104b) from the beam splitter (102) can optionally be guided, for the purpose of referencing, via a delay element (120), into the mixer (114), and from there into the photodiode (118). The device furthermore contains an IR acquisition unit (120) having one or more IR sensors which are designed for acquiring the body's own IR radiation from the body region (112) to be examined. The measuring signal from the IR sensor (120) is guided into an evaluation unit (124), e.g. a CPU. The evaluation is performed in the unit (124) in combination with the measuring signal from the terahertz sensor (118), optionally following a fast Fourier transform in the unit (128). In the evaluation unit (124), from the combined terahertz and IR measuring signals a value (126) for the concentration of the analyte, e.g. glucose, determined, which can then be displayed in a suitable manner, e.g. by means of a display (not shown).

The device furthermore contains a carrier element (130), e.g. a metal carrier such as copper, which is provided for receiving at least the IR acquisition unit (120) and optionally further elements, such as the optical device (110) and/or the terahertz sensor (118). The temperature of the carrier element (130) can be stabilized using suitable means, in order to allow for a temperature-compensated measurement of the IR signal and optionally of the terahertz signal.

Figure 3:
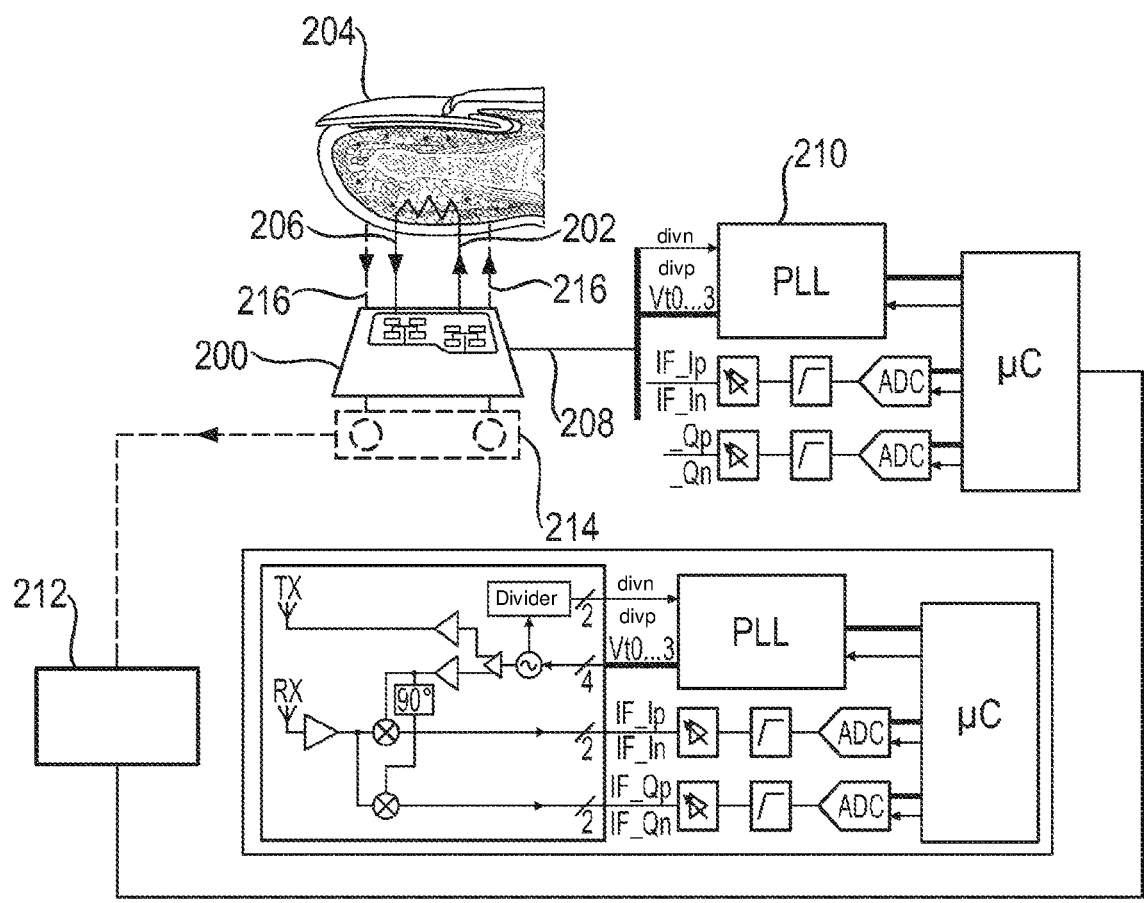
FIG. 3 shows a further embodiment of the device according to the invention.

FIG. 3 shows a further embodiment of the device according to the invention. The device contains a terahertz transceiver chip (200) which emits terahertz radiation (202) into the body region (204) to be examined, e.g. a fingertip, and is designed for acquiring the terahertz radiation (206) reflected therefrom. The measuring signal from the chip (200) is guided to the evaluation unit (212), e.g. a CPU, via a fast Fourier transform unit (210). The device furthermore contains at least one IR sensor (214) for acquiring the body's own IR radiation (216) from the body region (204) to be examined. The measuring signal acquired by the at least one IR sensor (214) is guided into the evaluation unit (212) and evaluated there in combination with the terahertz measuring signal.

Figure 4:
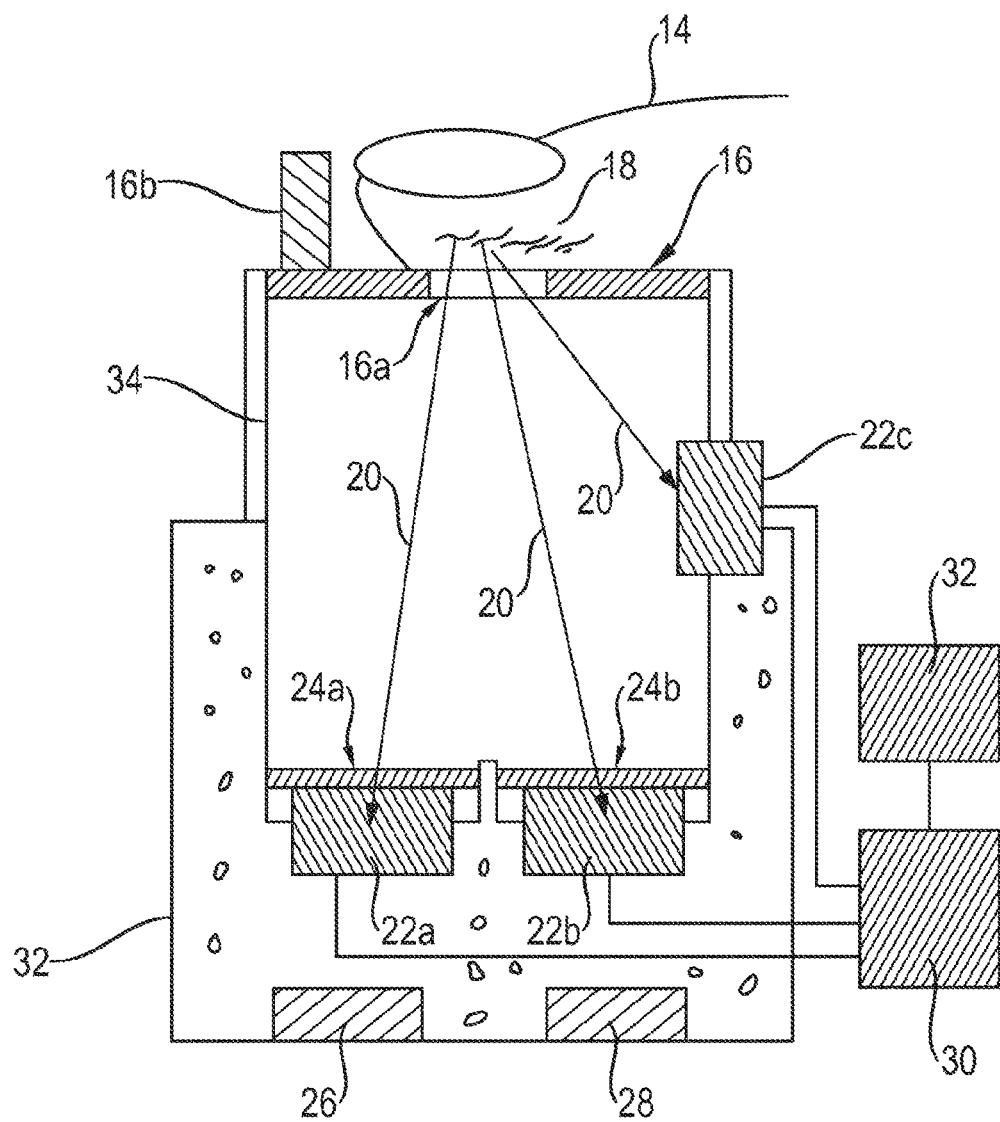
FIG. 4 is a detailed view of an embodiment of the IR acquisition unit according to the invention.

FIG. 4 is a detailed view of an embodiment of the IR acquisition unit according to the invention. A body region (14), to be examined, of a test subject, is introduced into the device.

In this case, a body region having a good supply of blood, such as a fingertip, is preferably selected. The body region (14) rests on a support element (16) which thermally isolates and contains a region (16a) which is optically transparent, at least in part, i.e. at least in the region of the measuring wavelengths, for the IR radiation (20) originating from the body region (14). The support element (16) contains means (16b) for determining the temperature of the body region to be examined, such as a fingertip (14), e.g. a temperature sensor. Furthermore, means, e.g. sensors, for acquiring and/or monitoring the contact position and/or the contact pressure of the body region to be irradiated may be provided (not shown). The support element can furthermore contain a temperature adjustment element (not shown).

IR radiation (20) from the body region (14) to be examined originates at least in part from the blood capillaries, close to the surface, in the region of the dermis (18), which capillaries are located at a distance of from approximately 2.5 to 3 mm from the body surface. An analyte located in the blood capillaries or optionally in adjacent tissue absorbs the radiation in the range of the specific absorption band thereof, the extent of the absorption correlating with the concentration of the analyte.

The device furthermore contains a first sensor (22a) and a second sensor (22b) for separate acquisition of the body's own IR radiation at different wavelengths or wavelength ranges (20) in the region of 0.7-20 µm, preferably 8-12 µm. The first and the second sensor can be designed as bolometers or thermopiles. Optionally, the first and the second sensor can also consist of arrays of individual sensor elements, e.g. 8×8 individual sensor elements.

The first sensor (22a) is designed for selective acquisition of the body's own radiation having a first wavelength or a first wavelength range from an absorption minimum of the analyte, a first filter element (24a) being provided which is selectively permeable for radiation having the first wavelength or having the first wavelength range. That is to say that the signal measured by the first sensor is substantially independent of the concentration of the analyte to be determined. The second sensor (22b) is in turn designed for selective acquisition of the body's own radiation (20) having a second wavelength or a second wavelength range from an absorption band, preferably in the region of an absorption maximum of the analyte to be determined, a second filter element (24b) being provided which is selectively permeable for radiation having the second wavelength or having the second wavelength range. This means that the signal acquired by the second sensor is dependent on the concentration of the analyte. Two or more second sensors may optionally be provided, which can acquire radiation having different wavelengths or wavelength ranges. For the determination of glucose it is possible for example for two second sensors to be used, which in each case separately acquire IR radiation in the range of 9.1 µm and 9.6 µm.

The filter elements (24a, 24b) are expediently arranged such that they rest directly on the relevant sensors (22a, 22b).

The device according to the invention optionally furthermore comprises a third sensor (22c) which is designed for unspecific acquisition of the body's own IR radiation (20) and serves for referencing, e.g. for referencing the body temperature in the body region (14) to be examined.

The sensors (22a, 22b and optionally 22c) can optionally be equipped with optical lens elements, e.g. biconvex lenses, in particular spherical lenses, in order to allow for focusing of the impinging body's own IR radiation.

The sensors (22a, 22b and optionally 22c) are in thermal equilibrium, in that they are in contact with a block (32) made of a conductive material, e.g. metal, or are embedded therein, e.g. in that they are arranged in a depression of the block. Alternatively, the thermally conductive material can also be designed as a plate or foil.

Furthermore, means (26) for determining the temperature of the block (24) containing the sensors (22a, 22b and optionally 22c), e.g. a temperature sensor, and means (28) for adjusting the temperature of the block (24) containing the sensors (22a, 22b and optionally 22c), e.g. cooling and/or heating elements, are provided.

The signals originating from the sensors (22a, 22b and optionally 22c), and the temperatures determined by the elements (16b) and (26) are transmitted to a CPU unit (30), if required an adjustment of the temperature for the sensors (22a, 22b and 22c) to a value that is lower than the temperature of the body region to be examined, and a temperature-compensated evaluation of the signals, being performed. The concentration of the analyte is determined on the basis of said evaluation. The result can then be shown in a display (32).

The inside (34) of the measuring system can be coated or equipped, entirely or in part, with a surface made of a material which does not reflect the IR radiation (20) originating from the body region (14) and/or which absorbs the IR radiation (20) originating from the body region (14).

The measuring system can furthermore comprise a coating or a housing which brings about electrical and/or thermal insulation with respect to the surroundings.

Figure 5:
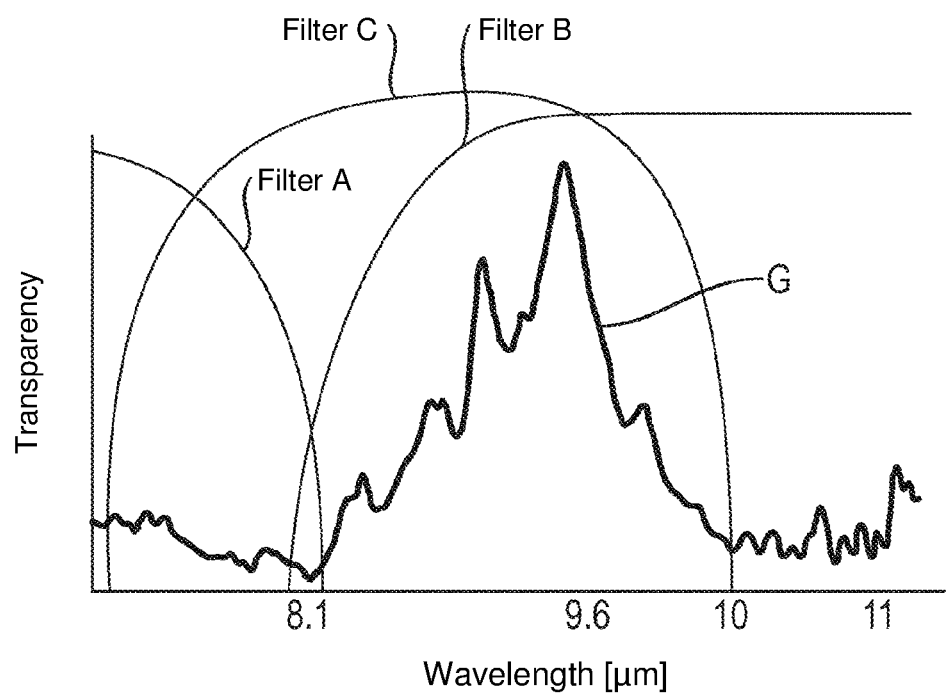
FIG. 5 shows an alternative embodiment for separate acquisition of the body's own IR radiation at different wavelengths according to the invention.

An alternative embodiment for separate acquisition of the body's own IR radiation at different wavelengths is shown in FIG. 5. The absorption curve of glucose in the region between 8 and 14 µm is shown as a bold line (G). For the purpose of separate acquisition of IR radiation having two different wavelengths, from this region, two sensors are used, which comprise different combinations of bandpass, highpass and/or lowpass filter elements. In one embodiment, the two sensors contain a wide bandpass filter (C) having a permeability in the region between 8 and 14 µm. In the case of the first sensor, the filter (C) is combined with a highpass filter (A) which is permeable for IR radiation having a wavelength of approximately 8.5 µm or less. A sensor that is equipped with the filters (A) and (C) will therefore acquire a signal from the region of 8-8.5 µm, which is substantially independent of the concentration of glucose. The second sensor is equipped with a combination of the bandpass filter (C) with a lowpass filter (B), which is permeable for IR radiation having a wavelength of 8.5 µm or more. The signal acquired by said sensor comprises an absorption band of glucose located in the region of approximately 9-10 µm, and is therefore dependent on the glucose concentration. Differential evaluation of the signals acquired by the two sensors makes it possible for the glucose concentration to be determined.

In another embodiment, a first sensor can also be equipped with the bandpass filter (C) and the highpass filter (A), while a second sensor is equipped only with the bandpass filter (C). The signal acquired by the first sensor is independent of the glucose concentration, while the signal acquired by the second sensor changes with the glucose concentration.

Figure 6:
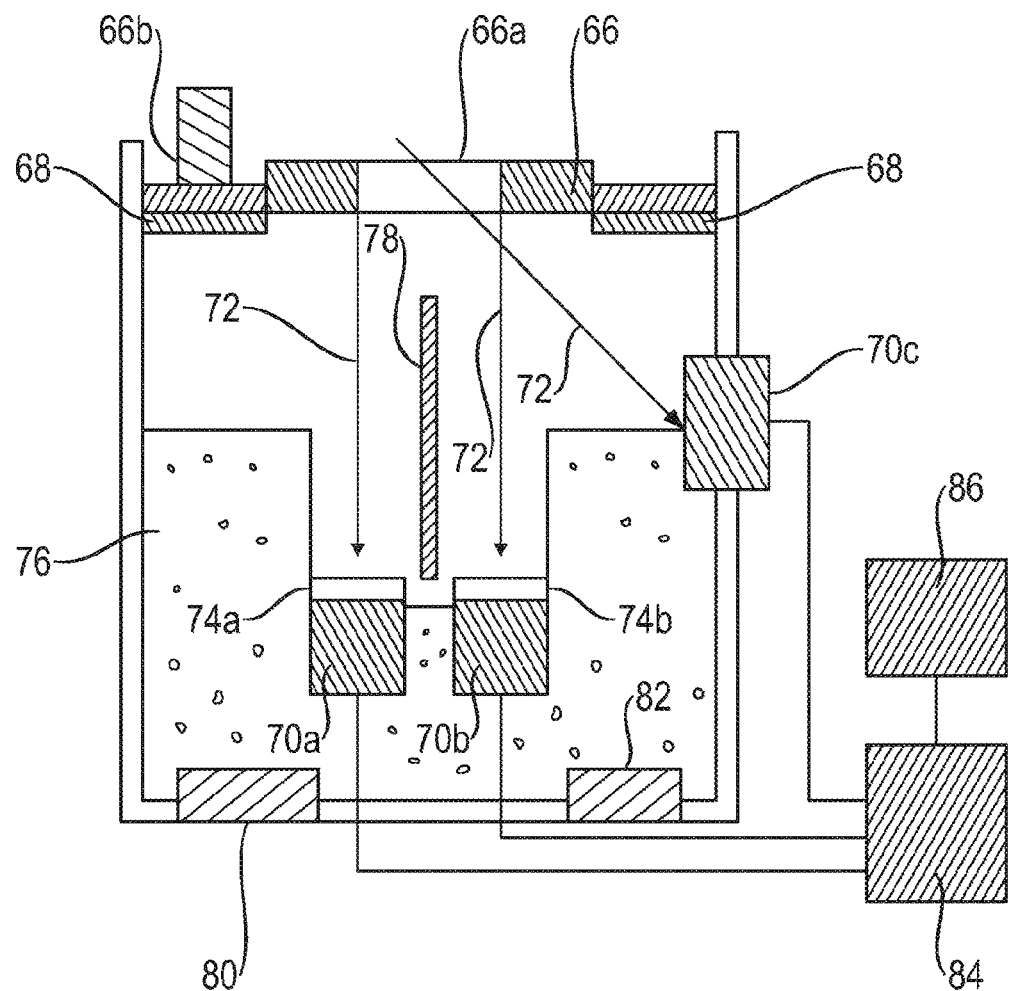
FIG. 6 is a schematic cross-sectional view of a further embodiment of the IR acquisition unit of the device according to the invention.

FIG. 6 is a schematic cross-sectional view of a further embodiment of the IR acquisition unit of the device according to the invention. In this case, the body region, to be examined, of the test subject (not shown), is arranged on a thermally insulating support element (66) which contains a region (66a) which is optically transparent for IR radiation, at least in part. The optically transparent region (66a) is for example an Si or Ge slice. The support element (66) is provided with a temperature sensor (66b) and optionally with a temperature adjustment element (not shown), which preferably comprises a Peltier element. In this case, the temperature of the body region can for example be set to a range of approximately 28-38° C. The support element (66) preferably contains means, e.g. sensors (68), for acquiring and/or monitoring the contact pressure, such as a load cell, as well as, optionally, sensors for acquiring and/or monitoring the contact position, such as a camera and/or a pulse sensor. Expediently, a contact pressure of approximately 1-50 N, e.g. approximately 20 N, is set.

The device furthermore contains a first IR sensor (70a) and a second IR sensor (70b) for acquiring the body's own IR radiation (72) having different wavelengths in the region of 0.7-20 µm, preferably of 3-20 µm, µm, from the body region examined. The first and the second sensor can in each case be designed as a bolometer or as a thermopile. Optionally, the first and the second sensor can also consist of arrays of individual sensor elements.

The first sensor (70a) can be designed for selective acquisition of the body's own IR radiation having a first wavelength, from an absorption minimum of the analyte, for example, a first filter element (74a), e.g. a bandpass filter having a narrow permeability being provided, which is selectively permeable for radiation having the first wavelength, in which the signal is substantially independent of the concentration of the analyte to be determined. For the determination of glucose, the first wavelength is for example 8.1±0.3 µm and/or 8.5±0.3 µm, preferably 8.1±0.2 µm and/or 8.5±0.2 µm, particularly preferably 8.1±0.2 µm, and/or 8.5±0.1 µm. The second sensor (74b) is in turn designed for selective acquisition of the body's own IR radiation (72) having a second wavelength from an absorption band, preferably in the region of an absorption maximum of the analyte to be determined, a second filter element (74b), e.g. a bandpass filter having narrow permeability, being provided which is selectively permeable for radiation having the second wavelength. During the determination of glucose, the second wavelength is for example 9.1±0.3 µm, 9.3±0.3 µm and/or 9.6±0.3 µm, preferably 9.1±0.2 µm, 9.3±0.2 µm and/or 9.6±0.2 µm, particularly preferably in the region of 9.1±0.1 µm, 9.3±0.1 µm, and/or 9.6±0.1 µm. Two or more second sensors may optionally be provided, which can acquire radiation having different wavelengths or wavelength ranges. For the determination of glucose it is possible for example for two second sensors to be used, which in each case separately acquire IR radiation in the range of 9.1 µm or 9.3 µm and 9.6 µm.

The filter elements (74a, 74b) are expediently in direct contact with the sensors (70a, 70b).

Alternatively, instead of bandpass filters having narrow permeability, the combination, shown in FIG. 5, of a bandpass filter having wider permeability and a highpass and/or a lowpass filter, can be used.

Optical focusing elements, e.g. lens elements, can be arranged in the beam path of the body's own IR radiation (72), between the body part to be examined and the sensors (70a, 70b and optionally 70c). For example, the sensors (70a, 70b) can optionally be equipped with optical lens elements, e.g. biconvex lenses, in particular spherical lenses, in order to allow for focusing of the impinging body's own IR radiation.

The device according to the invention optionally furthermore comprises a third sensor (70c) which is designed for unspecific acquisition of the body's own IR radiation (72) and serves for referencing, e.g. for referencing the body temperature in the body region to be examined. The third sensor (70c) can be designed as a bolometer or thermopile.

Optionally a partition wall (78) can be arranged between the first sensor (70a) and the second sensor (70b).

The sensors (70a, 70b and optionally 70c) are in thermal equilibrium, in that they are in contact with thermally conductive material, e.g. a block (76), a plate, or a film made of metal.

Furthermore, an element (80) for determining the temperature of the block (76) containing the sensors (70a, 70b and 70c) is provided, e.g. a temperature sensor. Furthermore, an element (82) for adjusting the temperature of the block (76) containing the sensors (70a, 70b and 70c) is provided, e.g. a cooling and/or heating element.

The signals originating from the sensors (70a, 70b and optionally 70c), and the temperatures determined by the elements (66b) and (80) are transmitted to a CPU unit (84) for temperature-compensated evaluation of the signals. The concentration of the analyte is determined on the basis of said evaluation, and the result can then be shown in a display (86). The CPU unit can furthermore be used for controlling the elements (68, 82).

Optionally, the inner surface of the measuring system can be coated with a material which is non-reflective for IR radiation and/or which absorbs IR radiation. Furthermore, the measuring system can comprise a thermal insulation with respect to the surroundings.

Figure 7:
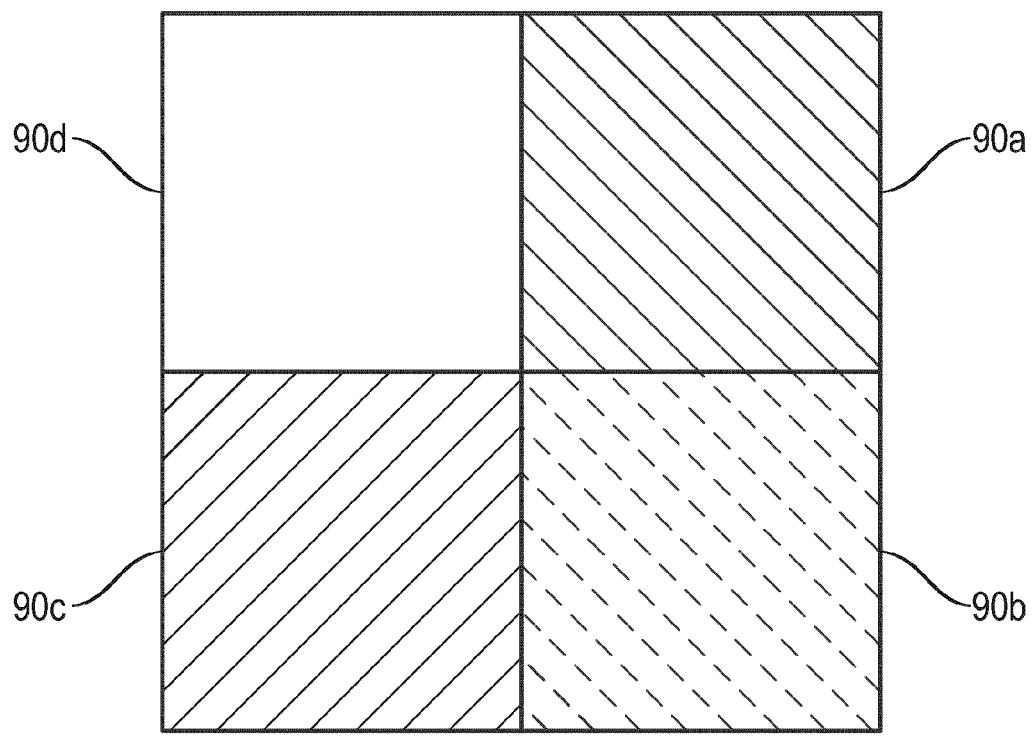
FIG. 7 shows an arrangement of sensors in the IR acquisition unit according to the invention.

FIG. 7 shows a particularly preferred arrangement of sensors in the IR acquisition unit. In this case, four IR sensors (90a, 90b, 90c and 90d) are provided, which are arranged together in a depression of a metal block (not shown) and are thus thermally equilibrated. Preferably, each of the sensors consists of an array of a plurality of, e.g. 8×8, individual sensor elements. The sensors (90a, 90b) are provided for selective acquisition of IR radiation having a wavelength from an absorption band of the analytes to be determined, and are therefore equipped with corresponding filter elements. For the determination of glucose, the sensor (90a) can be provided for selective acquisition of IR radiation having a wavelength of approximately 9.6 µm, e.g. 9.6±0.1 µm and the sensor (90b) can be provided for selective acquisition of IR radiation having a wavelength of approximately 9.1 µm, e.g. 9.1±0.1 µm or approximately 9.3 µm, e.g. 9.3±0.1 µm. The sensor (90c) is provided for selective acquisition of IR radiation having a wavelength from an absorption minimum of the analytes to be determined, and are therefore equipped with corresponding filter elements. For the determination of glucose, the sensor (90c) can be provided for selective acquisition of IR radiation having a wavelength of approximately 8.5 µm, e.g. 8.5±0.1 µm. The sensor (90d) does not contain a filter element, and is used for referencing.

Figure 8:
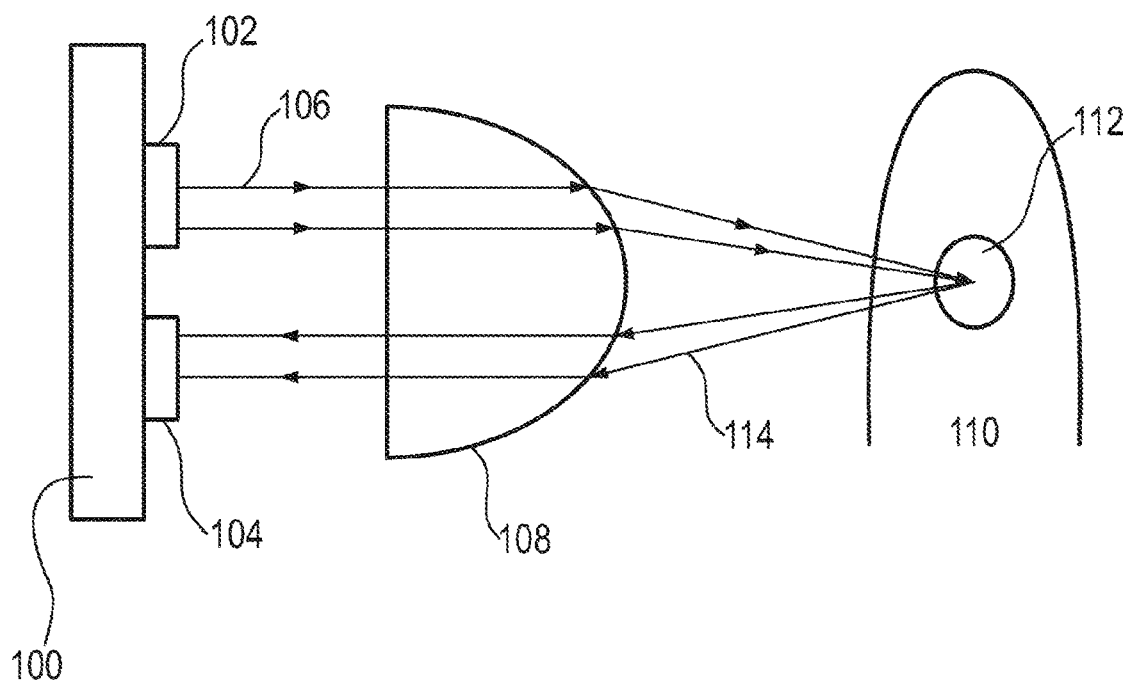
FIG. 8 shows an embodiment of a terahertz transceiver element comprising a focusing lens according to the invention.

FIG. 8 shows a particularly preferred embodiment of a terahertz transceiver element comprising a focusing lens. A terahertz transceiver element (100) contains a terahertz radiation source (102), e.g. an antenna, and a terahertz acquisition unit (104).

Terahertz radiation (106) emitted by the radiation source (102) is guided through a focusing lens (108), e.g. a spherical lens. The lens consists of a material that is transparent for terahertz radiation, such as polypropylene.

The radiation (106) is focused by the lens (108) on a predetermined zone (112) of the body region (110) to be examined, e.g. a finger (capillary blood region or saturated tissue). The focusing preferably takes place at a predetermined penetration depth, e.g. a penetration depth of 3-4 mm. The radiation (114) reflected from the focusing zone (112) is in turn guided through the lens (108), focusing on the terahertz acquisition unit (104) taking place.

Figure 9:
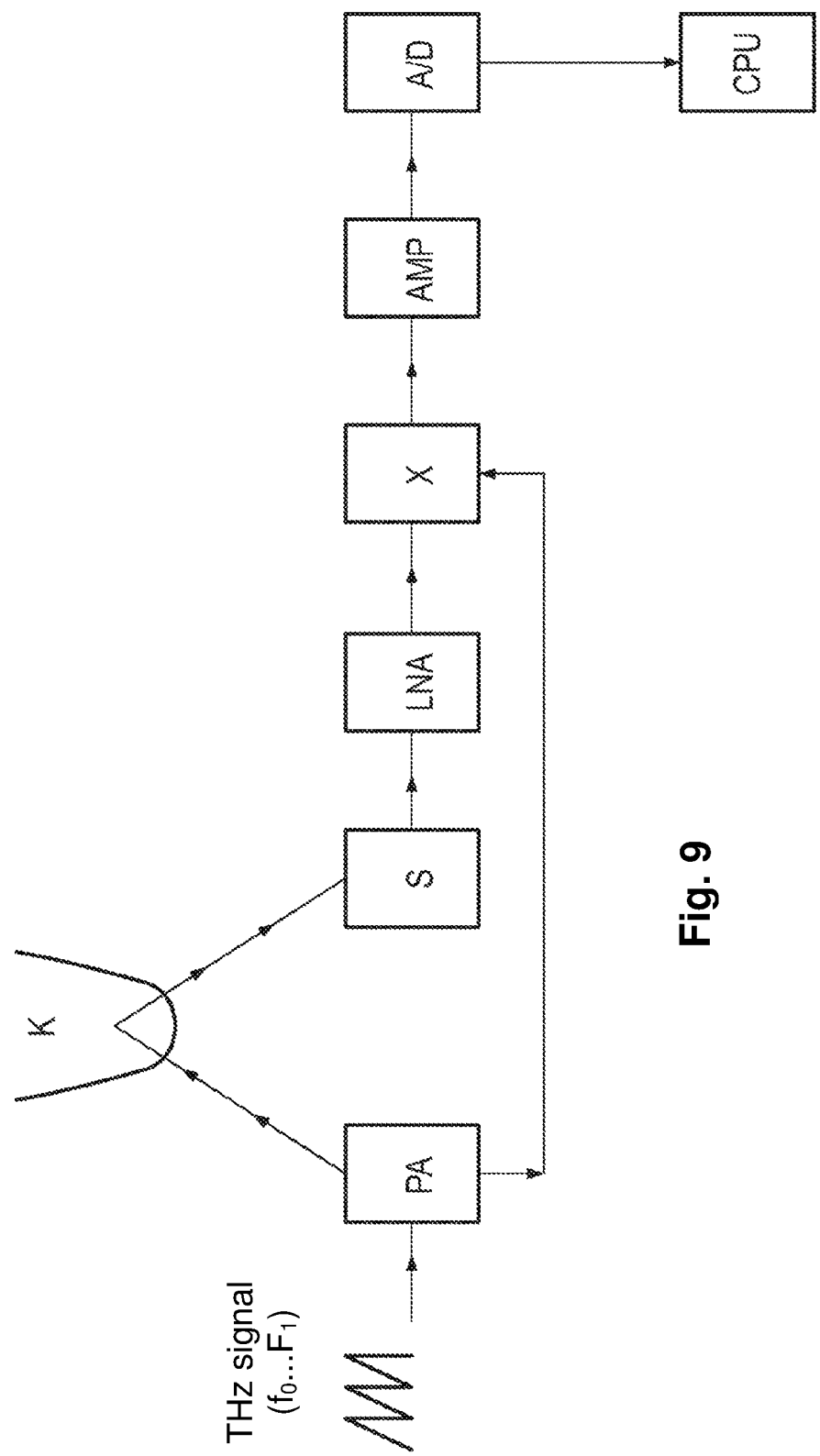
FIG. 9 shows an embodiment for the evaluation of a terahertz measuring signal according to the invention.

FIG. 9 shows a particularly preferred embodiment for the evaluation of a terahertz measuring signal. The frequency of a terahertz signal is modulated over a range (f0 ... f1) which contains an absorption band of glucose as the analyte to be determined. The modulation can take place continuously, e.g. by means of voltage variation using a voltage-controlled oscillator (VCO), or discontinuously.

The frequency-modulated terahertz signal reaches an antenna, e.g. a patch antenna (PA), and is radiated there to the body region (K) to be examined, e.g. a finger. This can be achieved by means of a lens (see e.g. FIG. 8) or a waveguide. Here, the terahertz radiation is reflected and reaches a sensor (S), e.g. a patch antenna or a dipole, and from there reaches a preamplifier, e.g. an LNA.

Subsequently, the signal is guided to a mixer (X) which multiplies the received signal and the transmit signal. On account of the distance to the body region and back again, the received signal has a different path length from the transmit signal. On account of the frequency modulation and the different path length and transit time for the received signal and the transmit signal, a frequency difference which is proportional to the transit time difference (e.g. path length difference of approximately 50 mm, corresponding to a transit time difference of 166 psec) results at the mixer. As a result a mixed signal (sin(fa)*(fb)=sin(fa+fb) and sin(fa−fb) results, the difference being the useful signal, which is further amplified by an amplifier (AMP). One or more phases of the signal are guided to an A/D converter and evaluated by a CPU.

The evaluation preferably comprises a fast Fourier transform (FFT), performed continuously, for filtering out undesired parasitic signals. Thus a different spectrum results, in each case, on the THz transmitter, as the frequency (f0 ... f1) increases, in a manner controlled by the voltage input. The signal corresponding to the beam path to the capillary layer and back can be identified by its characteristic transit time difference, and tapped. As a result, a characteristic curve progression is obtained, which corresponds to the reflection and absorption spectrum of glucose in the capillary blood. A comparative measurement at the absorption maxima and the absorption minima of glucose gives the glucose content in the capillary blood.

Alternatively to the frequency modulation, the terahertz signal can also be irradiated onto the body region to be examined as a pulse-modulated signal, signal pulses, in particular discrete signal pulses having a different frequency in each case, being radiated in at predetermined time intervals.

The invention claimed is:

1. A device for non-invasive determination of an analyte in blood of a test subject, said device comprising:
   (a) a unit for receiving a body region to be examined, originating from the test subject,
   (b) a radiation source for generating terahertz radiation in a wavelength region of from approximately 0.1 mm to approximately 5 mm for irradiating the body region to be examined, (c) a body radiation acquisition unit for acquiring radiation from the body region to be examined, comprising:
  (i) a unit for acquiring reflected terahertz radiation from the body region to be examined, wherein said unit is designed for acquiring terahertz radiation in a wavelength range in which an intensity of the reflected terahertz radiation changes in a manner dependent on analyte concentration,
  (ii) an infrared radiation (IR) acquisition unit for acquiring a body's own IR radiation from the body region to be examined, wherein said IR acquisition unit is designed for separate acquisition of IR radiation in at least two different wavelengths or wavelength ranges in a wavelength region of from approximately 0.7 µm to approximately 20 µm,
  the at least two different wavelengths or wavelength ranges include a first wavelength or a first wavelength range at which an intensity of the body's own IR radiation is substantially independent of a concentration of the analyte, and
  the at least two different wavelengths or wavelength ranges include a second wavelength or a second wavelength range at which an intensity of the body's own IR radiation changes in a manner dependent on the concentration of the analyte, and
(d) an element for measuring a temperature in the body region to be examined,
(e) (i) an element for measuring a temperature in the body radiation acquisition unit (c),
  (ii) an element for adjusting the temperature in the body radiation acquisition unit (c),
    the element for adjusting the temperature in the body radiation acquisition unit (c) being provided for the temperature in the body radiation acquisition unit (c) to be lower than the temperature in the body region to be examined, and
(f) an evaluation unit which is designed for temperature-compensated evaluation of signals originating from the body radiation acquisition unit (c), and for determining the concentration of the analyte based on the evaluated signals.

2. The device according to claim 1, wherein the radiation source for generating terahertz radiation (b) comprises a patch antenna or a dipole antenna.

3. The device according to claim 1, wherein the radiation source for generating terahertz radiation (b) is designed to radiate a frequency-modulated or pulse-modulated terahertz radiation.

4. The device according to claim 1, wherein a focusing lens, is arranged in a beam path between the radiation source for generating terahertz radiation (b) and the body region to be examined, the focusing lens consisting of a material that is substantially transparent for terahertz radiation.

5. The device according to claim 4, wherein the focusing lens is designed to focus the radiation, generated by the terahertz radiation source (b), on a predetermined zone of the body region to be examined, wherein the predetermined zone contains capillary blood.

6. The device according to claim 1, wherein the unit for acquiring the reflected terahertz radiation from the body region to be examined is designed to acquire a broadband spectrum in the terahertz range within a frequency range of from approximately 0.12 mm to approximately 5 mm (corresponding to 60 GHz to approximately 2.5 THz).

7. The device according to claim 1, wherein the unit for acquiring the reflected terahertz radiation from the body region to be examined is designed to bring about single-step or multi-step amplification of the terahertz radiation reflected from the body region to be examined.

8. The device according to claim 1, wherein the unit for acquiring the reflected terahertz radiation from the body region to be examined is designed for combined acquisition of reflected terahertz radiation from the body region to be examined and terahertz radiation radiated into the body region to be examined, and the unit for acquiring the reflected terahertz radiation from the body region to be examined is designed for acquiring frequency-modulated and pulse-modulated signals.

9. The device according to claim 1, wherein the device does not contain an external source for generating IR radiation.

10. The device according to claim 1, wherein the unit for receiving the body region to be examined comprises an element which is thermally insulating, at least in part, with respect to the unit for acquiring reflected terahertz radiation from the body region to be examined, and is intended for deposition of the body region to be examined, and contains a region that is transparent for terahertz radiation from approximately 0.12 mm to approximately 5 mm (corresponding to approximately 60 GHz to approximately 2.5 THz) or a sub-range thereof, and for IR radiation in the wavelength region from approximately 8 µm to 12 µm or in a sub-range thereof.

11. The device according to claim 1, wherein the unit for receiving the body surface region to be examined comprises sensors for acquiring and/or monitoring a contact position and/or a contact pressure of the body region to be examined in a range of approximately 0.5-100 N.

12. The device according to claim 1, wherein the IR acquisition unit comprises at least one first sensor and at least one second sensor, the first sensor being designed for acquiring IR radiation of the first wavelength or the first wavelength range,
  the second sensor being designed for acquiring IR radiation of the second wavelength or the second wavelength range.

13. The device according to claim 12, wherein the IR acquisition unit comprises two or more second sensors which are designed for acquiring IR radiation of different wavelengths or wavelength ranges, where the intensity of the body's own IR radiation changes in a manner dependent on the glucose analyte concentration.

14. The device according to claim 1, wherein the body radiation acquisition unit is in contact with a thermally conductive carrier unit for acquiring reflected terahertz radiation from the body region to be examined and the IR acquisition unit is in contact with the same thermally conductive carrier.

15. The device according to claim 1, wherein a temperature is provided in the body radiation acquisition unit which is at least 5° C. cooler than the temperature in the body region to be examined.

16. The device according to claim 1, wherein the device is configured to acquire initially the body's own IR radiation without irradiation of the body region to be examined being performed, and subsequently to irradiate the body region to be examined, with terahertz radiation, and then to acquire the reflected terahertz radiation.

17. The device according to claim 1, wherein the evaluation unit is provided for temperature-compensated evaluation of the signals based on temperature values measured and set by the elements (d) and/or (e).

18. The device according to claim 1, wherein the evaluation unit is provided for combined evaluation of the signals from the unit for acquiring reflected terahertz radiation from the body region to be examined and the IR acquisition unit.

19. A method for non-invasive quantitative determination of an analyte in blood of a test subject, the method comprising:
   (i) irradiating a body region originating from the test subject with terahertz radiation in a wavelength region of from approximately 0.1 mm to approximately 5 mm and acquiring reflected terahertz radiation from the irradiated body region in a wavelength range in which an intensity of the reflected terahertz radiation changes in a manner dependent on analyte concentration,
   (ii) separately acquiring from the test subject the body's own IR radiation of at least one first wavelength or one first wavelength range in a wavelength region of from approximately 0.7 µm to approximately 20 µm, where an intensity of the body's own IR radiation is substantially independent of analyte concentration, and of at least one second wavelength or one second wavelength range in the wavelength region of from approximately 0.7 µm to approximately 20 µm, where the intensity of the body's own IR radiation changes in a manner dependent on analyte concentration,
   a temperature in a region of a unit for acquiring IR radiation being lower than a temperature of the body region to be examined,
   (iii) evaluating a combination of signals acquired according to (i) and (ii) taking account of a temperature of the body region to be examined and a temperature where the terahertz radiation and the IR radiation are acquired, and
   (iv) determining a concentration of the analyte based on the evaluated combination of signals.

20. The method according to claim 19, wherein determining the concentration of the analyte is carried out by acquiring the body's own IR radiation from a fingertip of the test subject, without excitation by an external source of IR radiation.

21. The method according to claim 19, wherein the analyte is selected from alcohol, lactate, protein and urea.

22. The device according to claim 1, wherein the body region to be examined is a fingertip, an earlobe, a heel, a part of a fingertip, a part of an earlobe, or a part of a heel.

23. The device according to claim 1, wherein the radiation source is capable of generating terahertz radiation in a wavelength region from approximately 0.12 mm to approximately 5 mm.

24. The device according to claim 1, wherein the radiation source is capable of generating terahertz radiation in a wavelength region from approximately 0.1 mm to approximately 1 mm.

25. The device of claim 1, wherein the IR acquisition unit is also capable of unspecific acquisition of the body's own IR radiation.

26. The device of claim 1, wherein the unit for measuring temperature in the body region to be examined further comprises an element for adjusting temperature in the body region to be examined.

27. The device of claim 1, wherein the evaluation unit is additionally designed for selective evaluation of IR radiation originating from capillary blood vessels of a dermis region.

* * * * *